United States Patent [19]
Tatemichi et al.

[11] Patent Number: 4,719,588
[45] Date of Patent: Jan. 12, 1988

[54] MATRIX MULTIPLICATION CIRCUIT FOR GRAPHIC DISPLAY

[75] Inventors: Takaomi Tatemichi; Masato Takahashi, both of Tokyo, Japan

[73] Assignee: Seiko Instruments & Electronics Ltd., Tokyo, Japan

[21] Appl. No.: 607,420

[22] Filed: May 7, 1984

[30] Foreign Application Priority Data

May 6, 1983 [JP] Japan .................................. 58-79797
Oct. 7, 1983 [JP] Japan ................................ 58-188017

[51] Int. Cl.$^4$ ............................................. G06F 7/52
[52] U.S. Cl. .................................................... 364/754
[58] Field of Search ............... 364/715, 736, 749, 754, 364/757–760

[56] References Cited

U.S. PATENT DOCUMENTS 3,161,764 12/1964 Croy ..................................... 364/749
3,763,365 10/1973 Seitz ..................................... 364/754
4,044,243 8/1977 Cooper et al. ....................... 364/715
4,254,474 3/1981 Copper et al. ....................... 364/715
4,507,748 3/1985 Cotton ................................. 364/757
4,553,220 11/1985 Swanson ............................. 364/715

FOREIGN PATENT DOCUMENTS 0080528 6/1983 European Pat. Off. ............ 364/754

Primary Examiner—Gary V. Harkcom
Assistant Examiner—Dale M. Shaw
Attorney, Agent, or Firm—Bruce L. Adams; Van C. Wilks

[57] ABSTRACT

A matrices elements memory is constituted by random access memories, and its addresses are divided into a high address and a low address. The high address specifies areas holding matrix elements, and the low addresses of the matrix elements are designated sequentially bit-by-bit, starting from the least significant bit, so as to enable serial reading. A calculation unit consists of pairs of serial multiplicators which are either used in a cascade connection or independently as independent multiplicators, in order to correspond to the data length of a multiplicand.

16 Claims, 12 Drawing Figures

MATRIX MULTIPLICATION CIRCUIT FOR GRAPHIC DISPLAY

BACKGROUND OF THE INVENTION

This invention relates to a matrix calculation apparatus suitable for a graphic display.

A graphic display is an apparatus in which, as shown in FIG. 1, a matrix multiplication circuit 3 calculates line segments transferred thereto from a host computer 1 in accordance with instructions from an input device 2 such as a keyboard, so as to execute the enlargement, reduction, rotation, perspective viewing or translating of the figure. After a clipping circuit determines whether or not the figure after the transformation remains within a window, the line segment is transformed into coordinate values of the display screen coordinates by window viewport transformation. A line generation circuit 5 generates pixels interpolated between line segments, an image memory 6 temporarily stores the dot data, and the data is thereafter displayed on a CRT 7.

In order to transform a figure K1 to a figure K2, as shown in FIG. 2, a rotational movement and a translation must be carried out. For this reason, the matrix multiplication circuit 3 executes a multiplication of a transformation matrix R for the rotational movement, and of a transformation matrix P for the translation to obtain a coordinate data L, that is, an affine transformation according to the following formula, for each of the line segments $V_0$, $V_1$, $V_2$ of the figure K1:

$$L.P.R. = (X_i, Y_i, Z_i, 1) \cdot \begin{pmatrix} P_{11}P_{12}P_{13}P_{14} \\ P_{21}P_{22}P_{23}P_{24} \\ P_{31}P_{32}P_{33}P_{34} \\ P_{41}P_{42}P_{43}P_{44} \end{pmatrix} \cdot \begin{pmatrix} R_{11}R_{12}R_{13}R_{14} \\ R_{21}R_{22}R_{23}R_{24} \\ R_{31}R_{32}R_{33}R_{34} \\ R_{41}R_{42}R_{43}R_{44} \end{pmatrix}$$

This calculation is done in the following way. First, a multiplication of the translation matrix P as the multiplicand by the rotational transformation matrix R is done to obtain a transformation matrix W, and then all the line segments of the figure are multiplied by the transformation matrix W, using the coordinate matrix or vector $(x_i, y_i, z_i, 1)$ as the multiplicand.

This matrix multiplication is done conventionally in accordance with the following procedure. A transformation matrix U necessary for the calculation is temporarily read out in parallel to a shift register from a stack memory in which element matrices are stored, by a load instruction (FIG. 3III), and the data is converted into serial data by shift clocks. Thereafter, the serial data is applied to a multiplicator as a multiplier (FIG. 3V), and is then multiplied serially by the multiplicand that is input thereto previously.

Although a stack memory is an extremely convenient memory for calculation processing in which the data stored therein must be frequently updated, it has the problem for the serial multiplication such that the multipliers are first called by a load instruction before the start of the calculation and are applied bit-by-bit to the multiplicator by the shift clocks, so that an excessive period of time is needed for the execution of the load instruction, and the calculation time taken by one multiplication is very long.

The coordinate bit data usually consists of 32 bits, but the transformation matrices, such as the rotational transformation matrix R or the translation matrix P, have a long data bit length of 64 bits in order to provide an improved calculation accuracy.

Conventionally, the multiplication of transformation matrices with each other and the multiplication of a transformation matrix by a coordinate matrix are carried out by using a serial multiplicator of a 64-bit capacity. When the transformation matrix W is multiplied by the coordinate matrix, therefore, 32 zeros are added to the high-order bits of the coordinate data so as to make it match the data length of the transformation matrix acting as the multiplier, and the multiplication is effected between the data each comprised of 64 bits.

Accordingly, $64+64=128$ shift clocks are required for a single calculation, although the multiplication is actually done between the data of an effective length of 32 bits and the data of an effective length of 64 bits, and although the total length of data actually handled is only 96 bits. In other words, as many as 32 bits of excess clocks are necessary, and time is wasted during the period of the calculation with the transformation matrix W and the coordinate matrix that occupies the major proportion of the calculation time in a graphic display apparatus.

SUMMARY OF THE INVENTION

In accordance with the present invention, a matrices elements memory is constituted in such a manner that a random access memory is divided into a plurality of areas, each of elements of a plurality of different matrices are stored in the areas so that the area in which a desired matrix element is stored can be directly accessed, and so that the data can be serially read out by shift clocks. In addition, a multiplication circuit is constituted in such a manner that serial multiplicators are arranged to form pairs so that their bit length can be changed in accordance with the bit length of a multiplicand.

An object of the present invention is to provide a matrix multiplication circuit which can reduce the time taken to read out data from a matrices elements memory, which can form serial multiplicator pairs in accordance with the data length of a multiplicand, and which can multiply a transformation matrix by coordinate matrix at high speed.

Other objects and effects of the invention will become more apparent from the following detailed description thereof.

DESCRIPTION OF THE PREFERRED EMBODIMENTS

Figure 4:
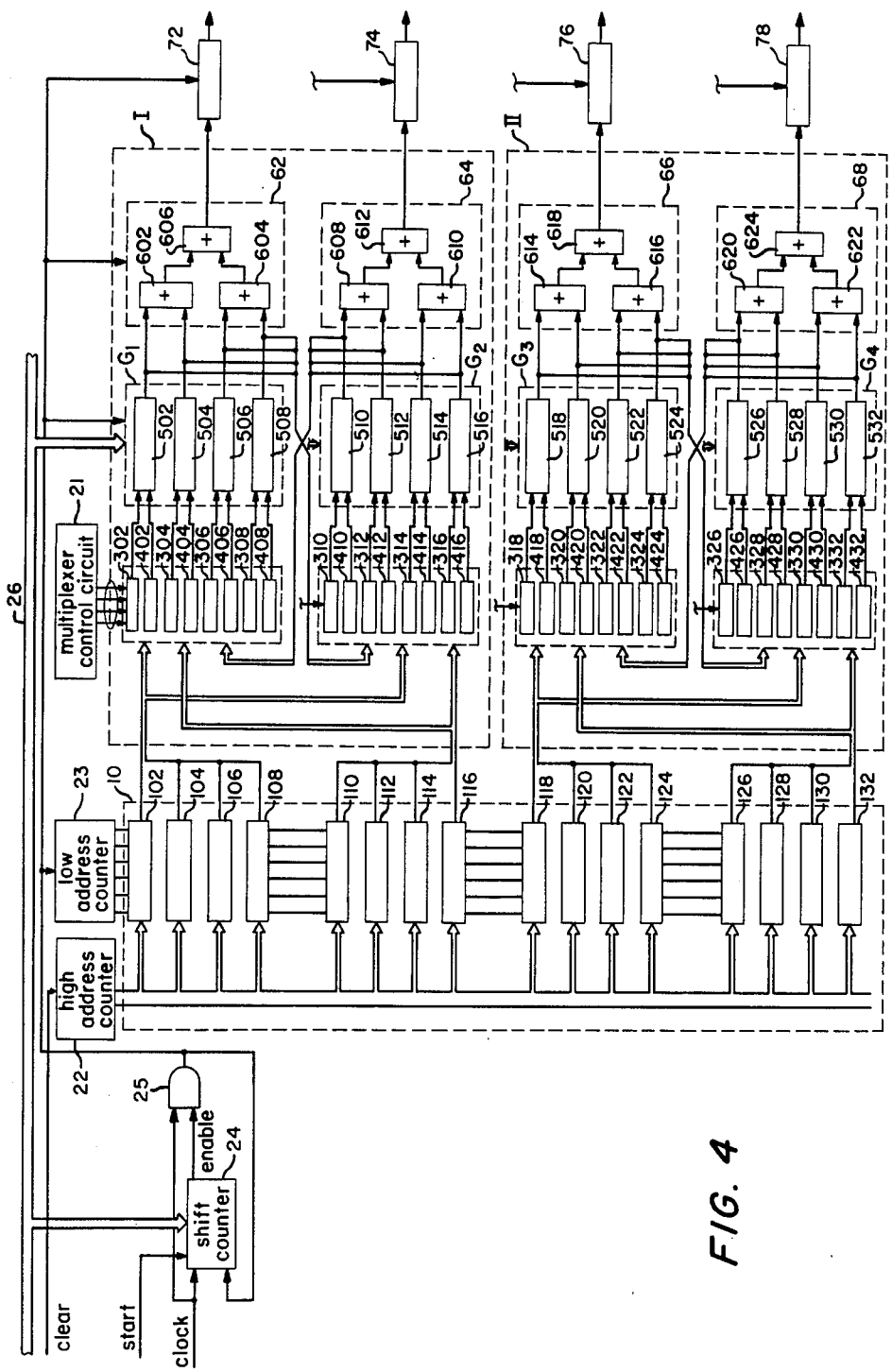
FIG. 4 is a block diagram of the multiplication circuit in accordance with one embodiment of the present invention.
Figure 5:
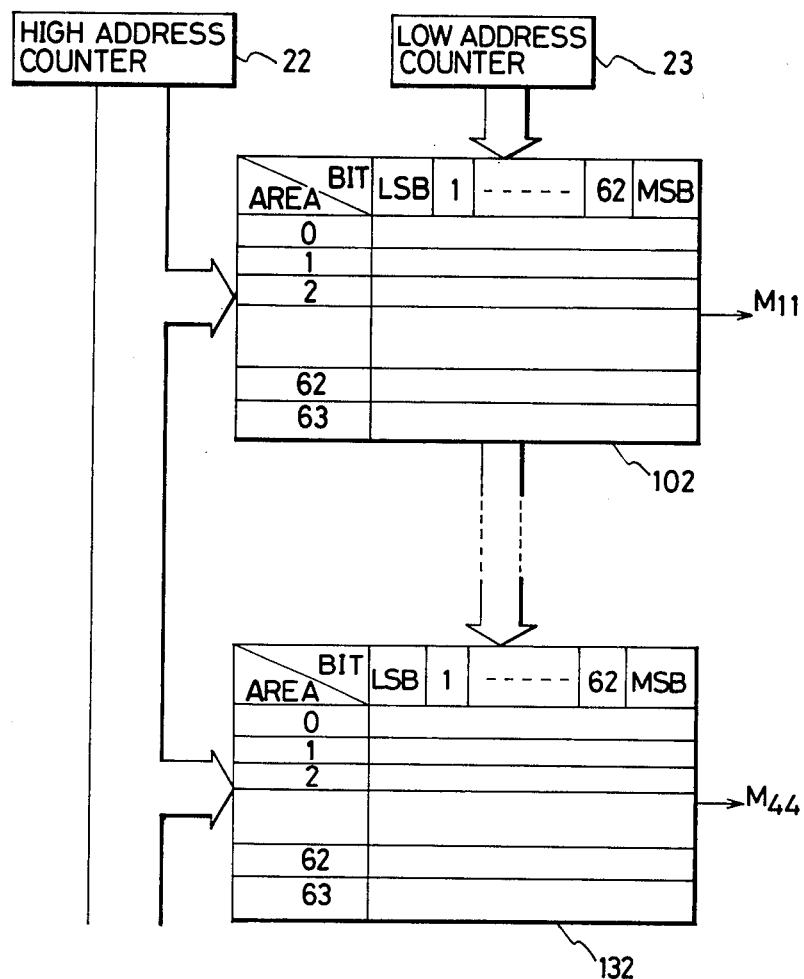
FIG. 5 is a diagram of the construction of the memory as one embodiment of the matrices elements memory of FIG. 4.

In FIG. 4, a matrices elements memory or matrix-storing means 10 is constructed of random access memories (hereinafter referred to as "RAMs") 102–132 forming 16 blocks and storing matrix elements U1-1–U44. Each RAM is divided into 64 areas each consisting of 64 bits capacity, as shown in FIG. 5, and the nth area of each RAM stores a corresponding matrix element (Uij) of one transformation matrix, so that 64 different matrices can be read therefrom.

Returning again to FIG. 4, the output terminals of the RAMs 102–132 of the matrices elements memory are connected to multiplier input terminals of serial multiplicators 502–532 by second multiplexers or second change-over means 402–432 that are controlled by a multiplexer control circuit 21. The address terminals of each RAM are divided into high address terminals A11 ... A6 for selecting the nth area and low address terminals A5 ... Ao for reading out the element bit data (Uij)$_n$ stored in that area. The high address terminals A11 ... A6 of each RAM are connected in common to the output terminal of a high address counter 22, while the low address terminals A5 ... Ao are connected in common to a low address counter 23, so that the nth area can be specified by a high address and thereafter the low addresses are sequentially designated from the least significant address so that the matrix element can be read out in serial bit data.

A shift counter 24 is connected to a clock signal source, an AND gate 25 and a data bus 26, and is constituted so that when shift number signals are input thereto from the data bus after the reception of a start signal, the shift counter 24 outputs an enable signal until a predetermined number of clock signals have been input to the low address counter 23. The AND gate 25 continues to output the shift clocks to the low address counter 23, the serial multiplicators 502–532, and addition circuits 62–68 only during the period in which the shift counter 24 outputs the enable signal.

Multiplication means consists of two multiplication circuit groups I and II, each multiplication circuit group is further divided into two groups G1 and G2, G3 and G4 respectively. The multiplication means also contains first multiplexers or first change-over means 302–332 that are controlled by signals from the multiplexer control circuit 21, the serial multiplicators 502–532 that can be connected in cascade connections by corresponding first multiplexers or can be used independently of one another, the addition circuits 62–68 mentioned above that add outputs or products from these multiplicators, and the second multiplexers or second change-over means 402–432.

Figure 6:
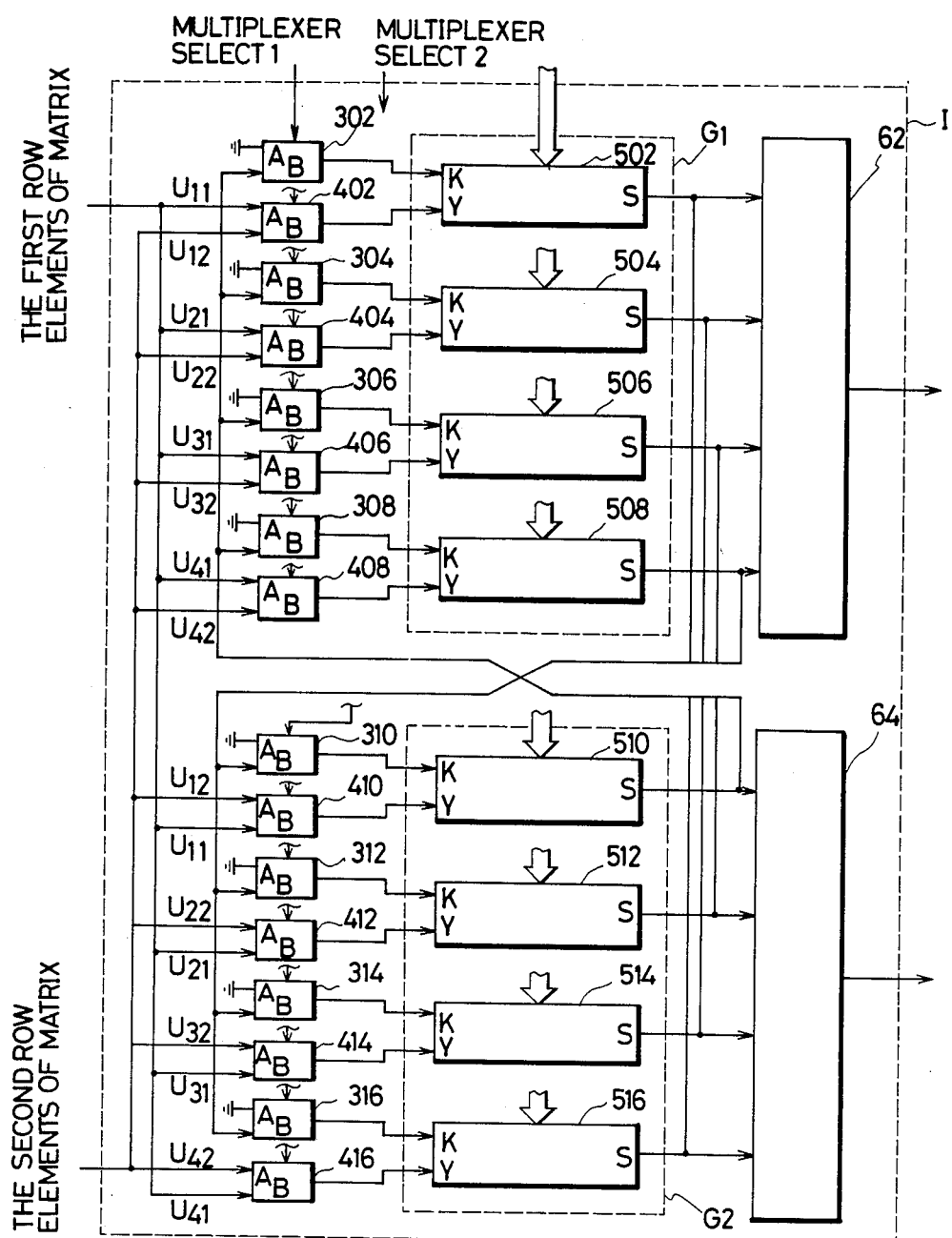
FIGS. 6 and 7 are block circuit diagrams of details of the multiplication circuit of FIG. 4.
Figure 7:
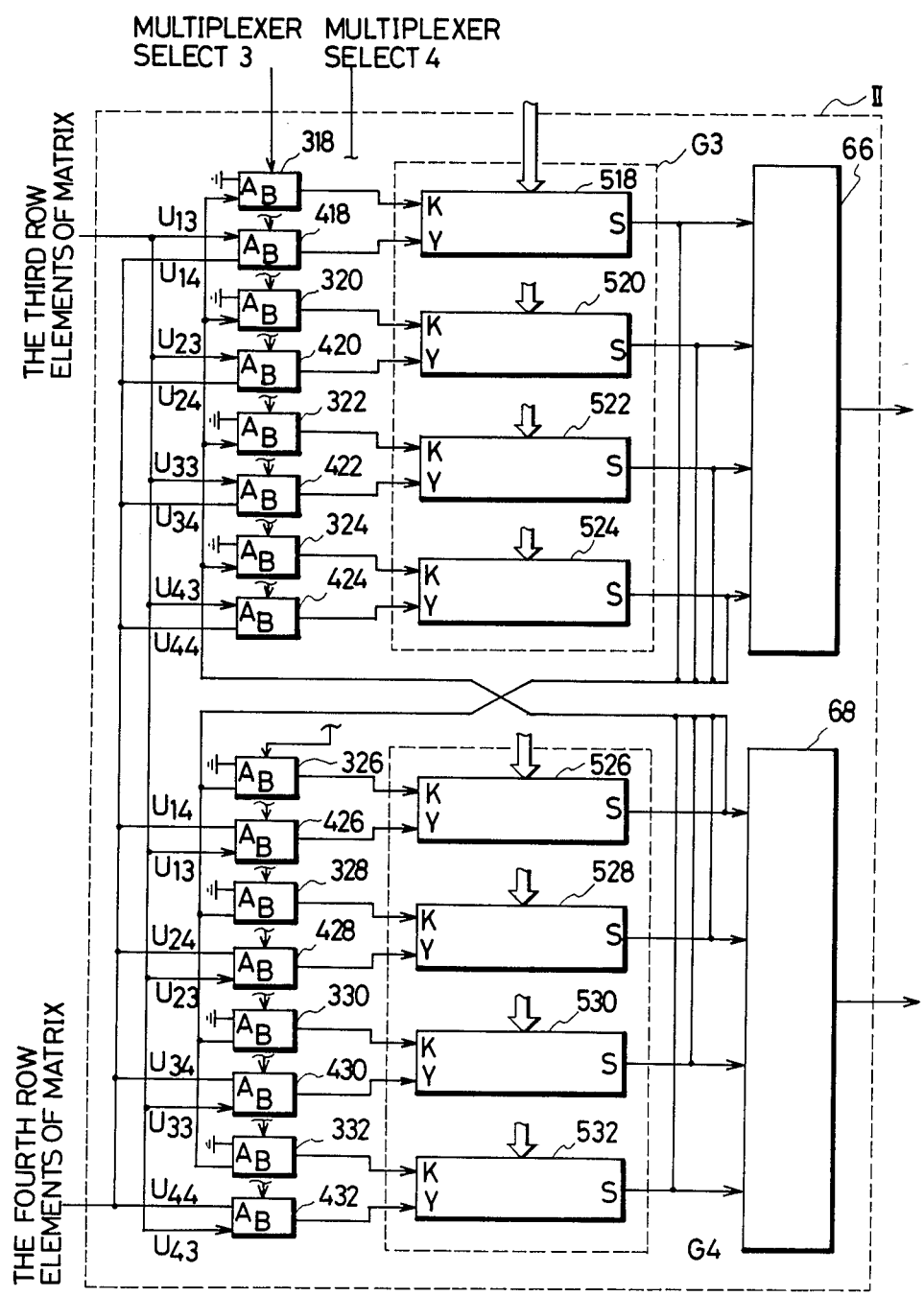

As shown in FIGS. 6 and 7, the multiplication circuits I and II have serial multiplicators 502–516, 518–532, respectively, that can multiply 32-bit data in a serial form. Each multiplicator has a cascade terminal K, a direct-connection terminal Y, and a serial output terminal S. The cascade terminals K are connected to the corresponding first multiplexers 302–332 each of which has two input terminals A and B, a selection signal input terminal and an output terminal. The direct-connection terminals Y are connected to the corresponding second multiplexers 402–432 each of which has two input terminals, a selection signal input terminal and an output terminal.

Figure 9:
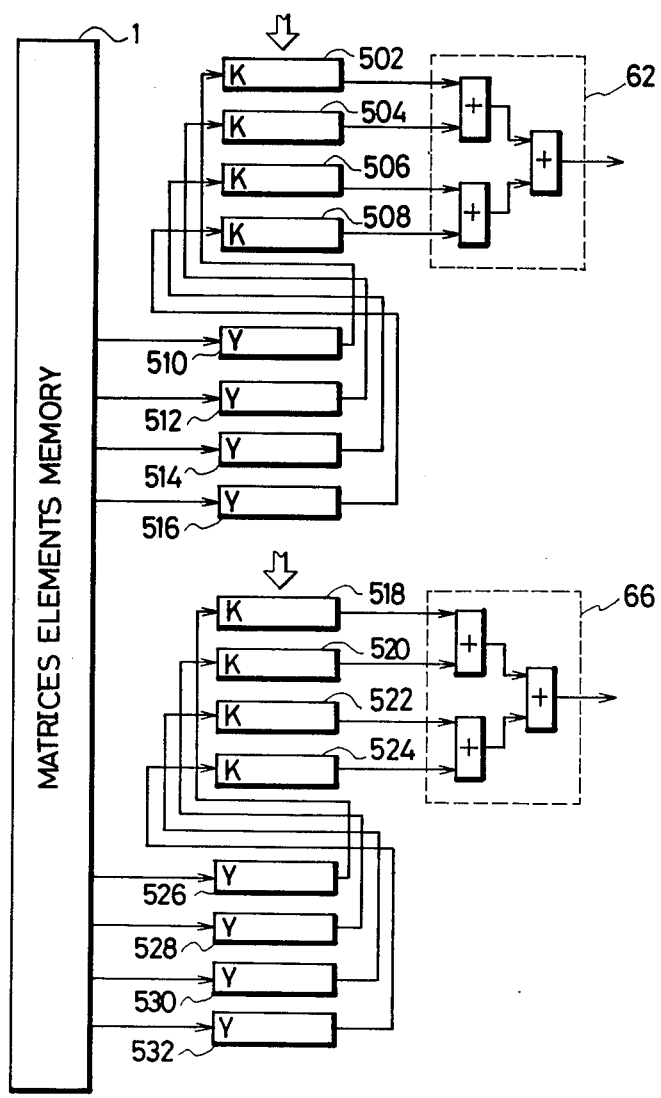
Figure 10:
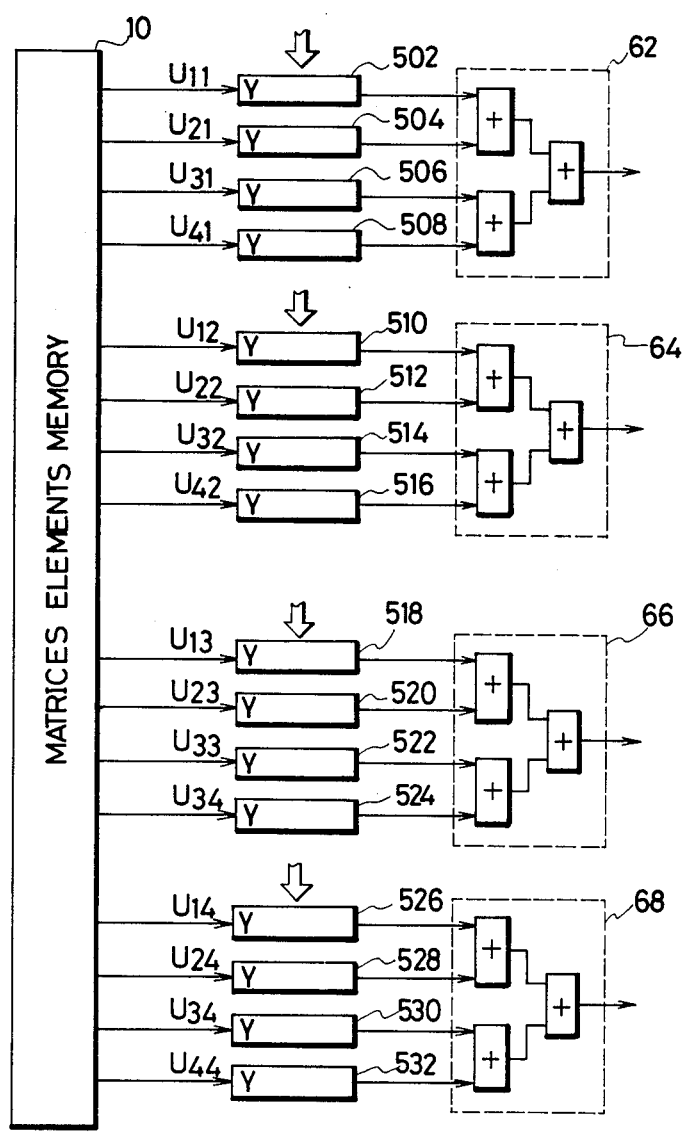
FIG. 10 is a schematic illustration showing how the multiplicators are connected when a coordinate matrix and a transformation matrix are multiplied together in the circuit of FIG. 4.

One of the input terminals A of each of the first multiplexers 302–332 is grounded and the other B is connected to the output terminal of a multiplicator of the other group so as to form pairs of multiplicators 502 and 510, 504 and 512, 506 and 514, 508 and 516, 518 and 526, 520 and 528, 522 and 530, and 524 and 532. Thus, the multiplicators can be selectively connected to each other so that when they are placed in this cascade connection, they can handle or process 64-bit multiplicands. In the first multiplication circuit I, the input terminal A of each of the second multiplexers 402–416 is connected to an output terminal of the first row of the matrices elements memory 10, and its input terminal B is connected to an output terminal of the second row thereof, so that each element $U_{11}$ ... $U_{41}$ and $U_{12}$ ... $U_{42}$ of the first and second rows of the matrices elements memory 10 can be input thereto. In the second multiplication circuit II, the input terminals A are connected to an output terminal of the third row of the matrices elements memory 10, and the input terminals B are connected to an output terminal of the fourth row, so that each element of the third and fourth rows U—. .. $U_{43}$ and $U_{14}$ ... $U_{44}$ can be input thereto. According to this arrangement, matrix elements of either row can be selected for each multiplication circuit for the multiplication of transformation matrices (FIGS. 8 and 9), and the transformation matrix elements corresponding to each multiplicator can be selectively output for the multiplication of coordinate matrix by a transformation matrix (FIG. 10).

In addition circuits 62–68 each consist of two adders 602 and 604, 608 and 610, 614 and 616, 620 and 622, respectively, that are connected to two of these multiplicators to obtain a sum of the outputs thereof, and third adders 606, 612, 618, 624 which obtain a sum of the outputs of these pairs of adders. Each of the addition circuits 62–68 outputs one of the elements of the matrix obtained by the calculation to corresponding buffer registers 72–78 connected thereto.

Figure 11:
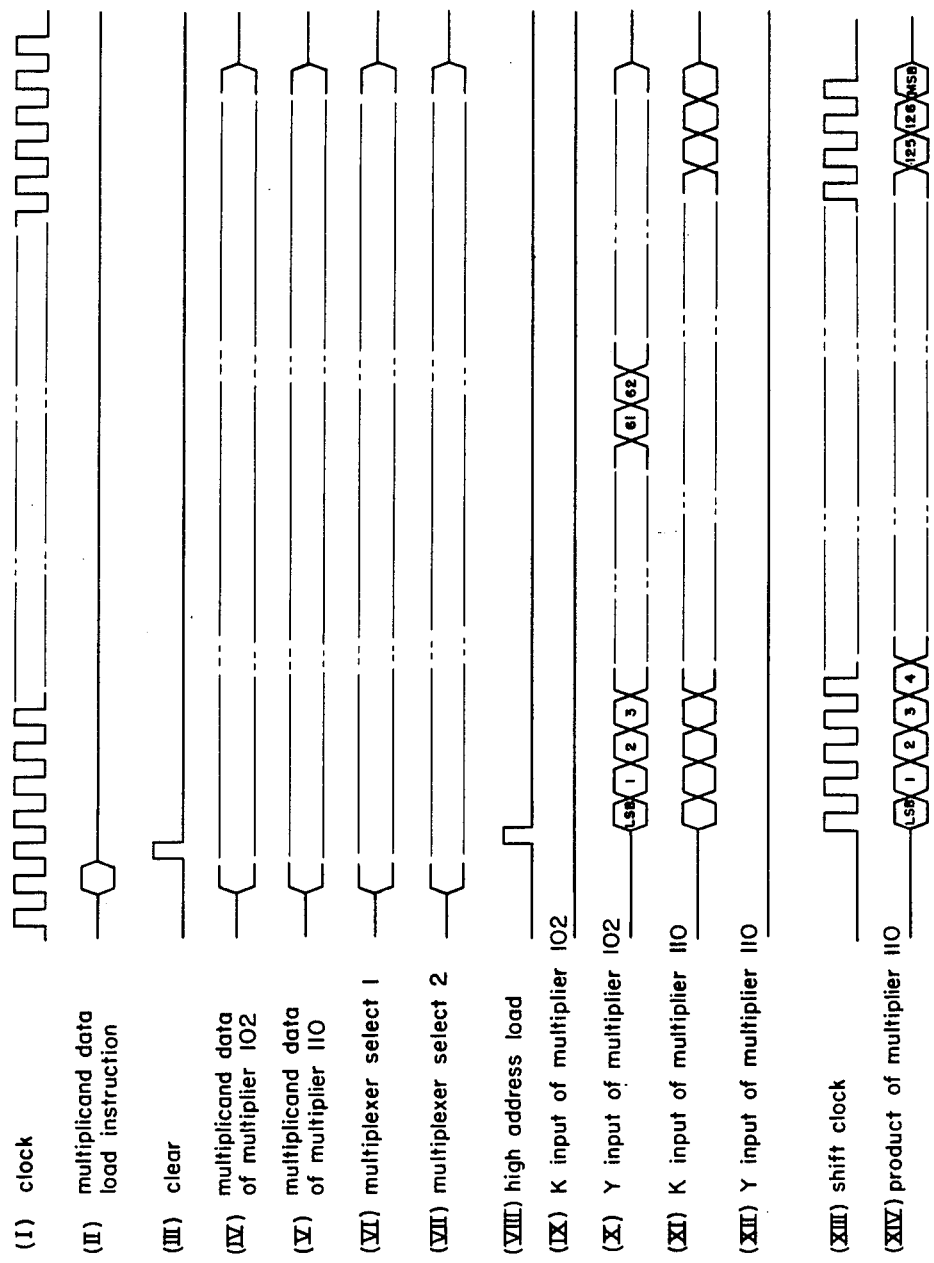
FIG. 11 is a timing chart of the operation of the circuit of FIG. 4 when transformation matrices are multiplied together.
Figure 12:
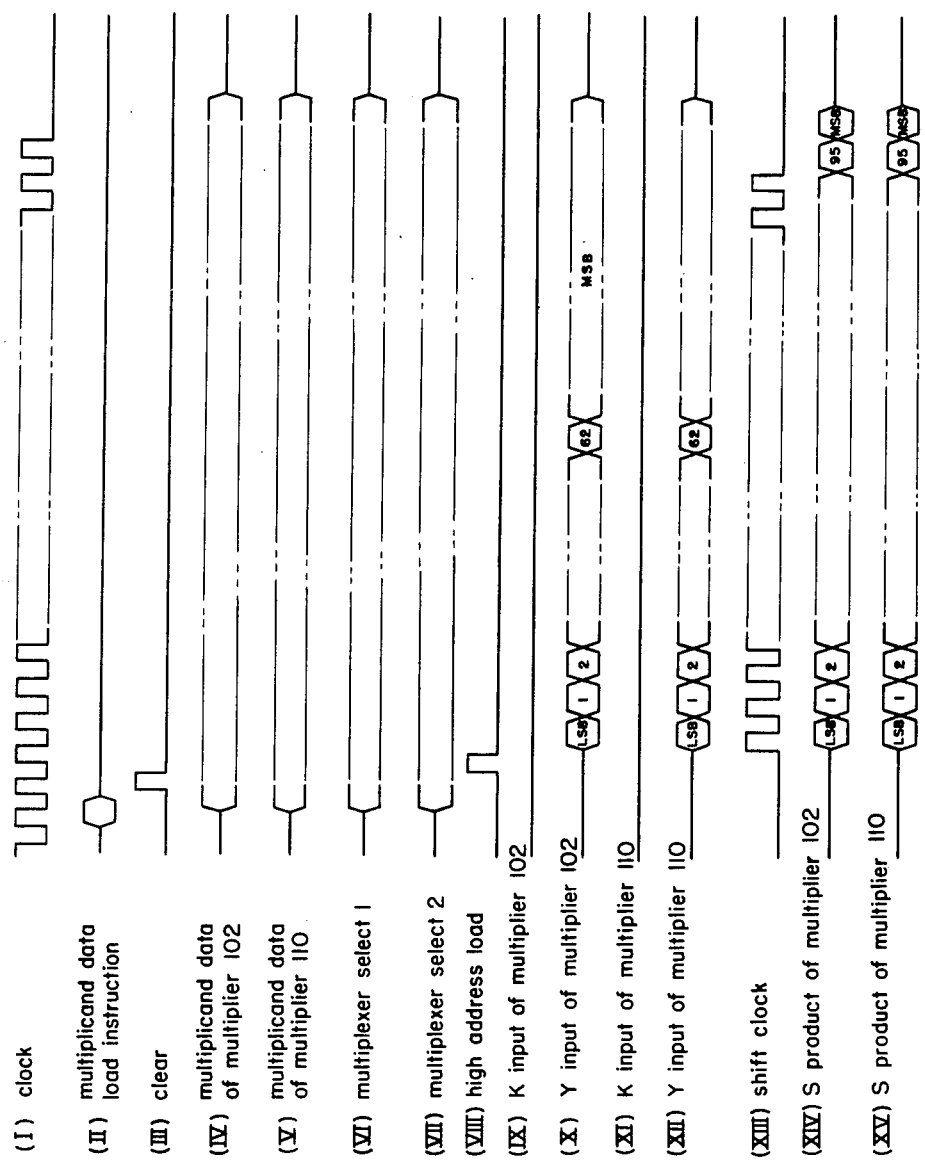
FIG. 12 is a timing chart of the operation of the circuit of FIG. 4 when a conversion matrix is multiplied by coordinate data.

The operation of the circuit with this construction will now be described with reference to the timing charts of FIGS. 11 and 12.

Figure 1:
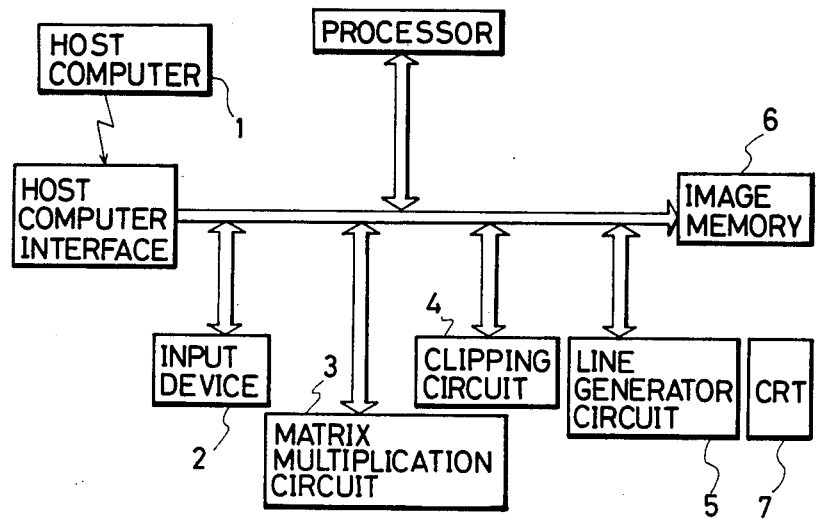
FIG. 1 is a block diagram of the construction of a graphic display.
Figure 2:
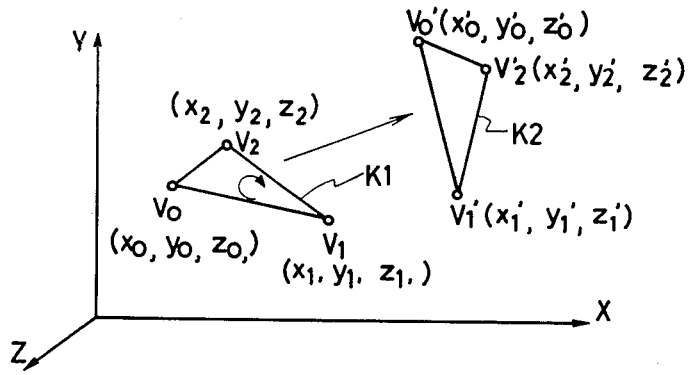
FIG. 2 is a schematic view explaining the transformation of a figure on a graphic display.
Figure 3:
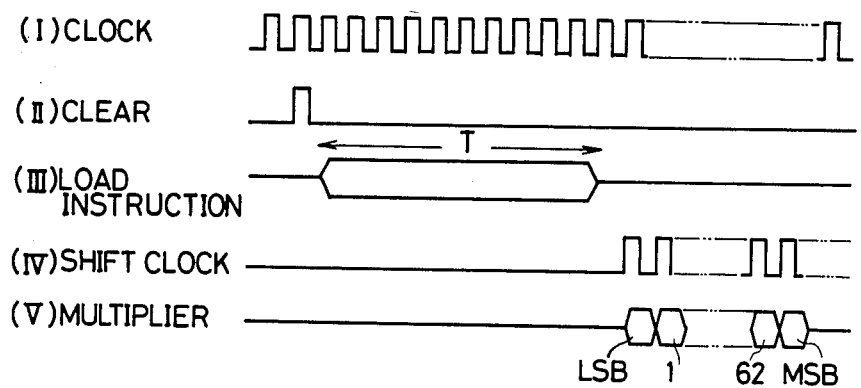
FIG. 3 is a timing chart of the operation of a conventional matrix multiplication apparatus using a stack memory as a matrices elements memory.

This example of the operation concerns the case in which line segment input from a host computer, such as the triangular figure K1 of FIG. 1, is transformed to figure K2 by instructions from the keyboard.

In this example, a multiplication of the translating transformation matrix P by the rotational movement transformation matrix R must be done first, as described above, to obtain the transformation matrix W.

First of all, the multiplexer control circuit 21 selects terminals A of the first multiplexers 302–308 of the first group G1 of the multiplication circuit I, and terminals B of the first and second multiplexers 310–316 and 410–416 of the second group G2 thereof. Similarly, it selects terminals A of the first and second multiplexers 318–324 and 418–424 of the first group G3 of the second multiplication circuit II and terminals B of the first and second multiplexers 326–332 and 426–432 of the second group G4 thereof. As a result, the multiplicators of each group are connected to the corresponding multiplicators of the other group in a cascade arrangement. Namely, multiplicator 502 is connected to multiplicator 510, 504 to 512, 506 to 514 and 508 to 516 in the multiplication circuit I, and multiplicator 518 is connected to multiplicator 526, 520 to 528, 522 to 530 and 524 to 532 in the multiplication circuit II, thereby forming multiplicators of a 64-bit construction or capacity. Thus, 64-bit data can be input as a multiplicand.

Figure 8:
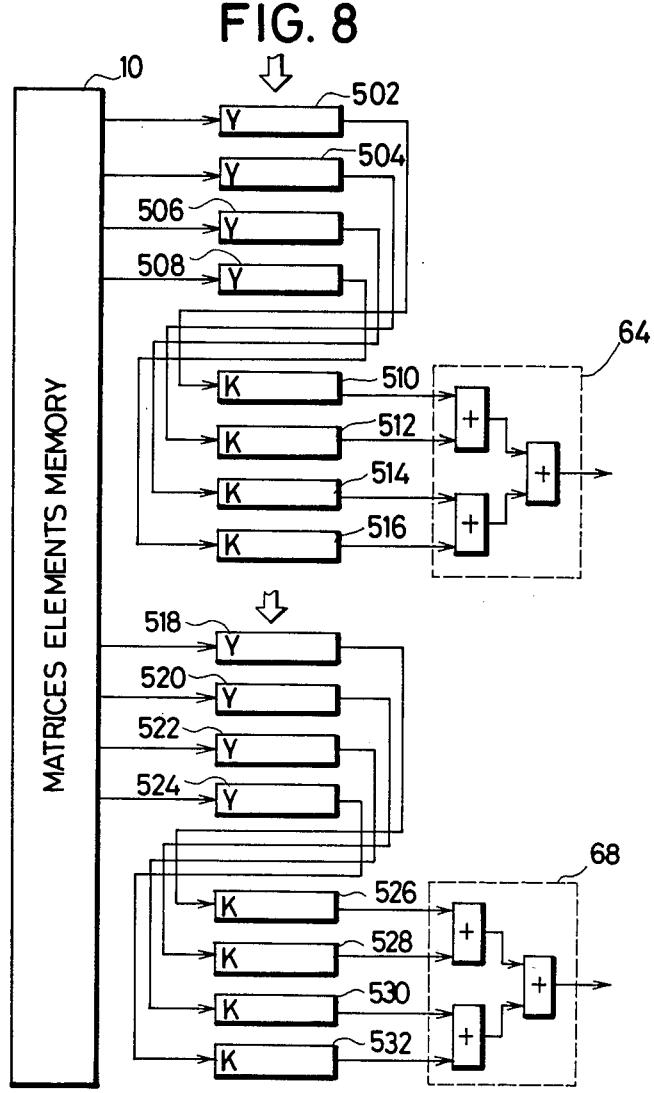
FIGS. 8 and 9 are schematic illustrations showing how the multiplicators are connected when conversion matrices are being multiplied together in the circuit of FIG. 4.

After this preparation is completed, the translating transformation matrix acting as the multiplicand is input to the multiplication circuits I, II from the data bus 26. Accordingly, as shown in FIG. 8, the pairs of multiplicators in the multiplication circuit I receive the elements of the first column of the translating transformation matrix P. Namely, the multiplicators 502 and 510 receive element $P_{11}$ of column 1, row 1, the multiplicators 504 and 512 receive element $P_{12}$ of column 1, row 2, the multiplicators 506 and 514 receive element $P_{13}$ of column 1, row 3, and the multiplicators 508 and 516 receive element $P_{14}$ of column 1, row 4. The pairs of multiplicators in the multiplication circuit II similarly receive the elements of the first column of the transformation matrix P. Namely, the multiplicators 518 and 526 receive element $P_{11}$ of column 1, row 1, the multiplicators 520 and 528 receive element $P_{12}$ of column 1, row 2, the multiplicators 522 and 530 receive element $P_{13}$ of column 1, row 3, and the multiplicators 524 and 532 receive element $P_{14}$ of column 1, row 4. After the input of the multiplicand is thus completed, the area n of the matrices elements memory 10 which holds therein the rotational movement transformation matrix R necessary for moving figure K1 to figure K2 is selected. The high address corresponding to this area is set in the high address counter 22, and at the same time the shift counter 24 outputs shift clocks to the low address counter 25 to read out sequentially the data $(Uij)_n$ stored in the area n designated by the high address counter 22, at the timing of the shift clocks, starting from the least significant bit LSB.

Accordingly, the multiplicators in the first group G1 of the multiplication circuit I receive the elements of the first column of the rotational movement transformation matrix R in synchronism with the shift clocks and start the multiplication. Namely, the multiplicators 502 receives the multiplier and starts a multiplication with element $R_{11}$ of column 1, row 1, the multiplicator 504 does the same with element $R_{21}$ of the column 2, row 1, the multiplicator 506 does the same with element $R_{31}$ of column 3, row 1, the the multiplicator 508 does the same with element $R_{41}$ of column 4, row 1. The multiplicator 510 outputs $R_{11} \times P_{11}$, the multiplicator 512 outputs $R_{12} \times P_{21}$, the multiplicator 514 outputs $R_{13} \times P_{31}$ and the multiplicator 516 outputs $R_{14} \times P_{41}$. The results or products of these calculations are added by the addition circuit 64 to provide the element $R_{11} \cdot P_{11} + R_{12} \cdot P_{21} + R_{13} \cdot P_{31} + R_{14} \cdot P_{41}$. At the same time, the multiplication circuit II receives the elements of the third column. Namely, the multiplicator 518 receives $R_{13}$, the multiplicator 520 receives $R_{23}$, the multiplicator 522 receives $R_{33}$, and the multiplicator 524 receives $R_{43}$, starting from the least significant bit, and the results of the calculations therewith are output from the multiplicators 526–532. These results are added by the addition circuit 68 to provide the element of column 1, row 3, i.e., $R_{11} \cdot P_{13} + R_{12} \cdot P_{23} + R_{13} \cdot P_{33} + R_{14} \cdot P_{43}$. The elements $W_{11}$ and $W_{13}$ thus calculated are input to the shift registers 74 and 78 connected to the corresponding addition circuits 64 and 68, and thereafter they are digitally processed and ordered in a predetermined bit length, e.g., 64 bits, and are stored in an empty area of the matrices elements memory 10. In the same way, similar calculations are carried out three times with different column elements of the translating transformation matrix acting as the multiplicands, to obtain the transformation matrix elements $W_{21}$, $W_{23}$, $W_{31}$, $W_{33}$, $W_{41}$ and $W_{43}$.

When the calculation of this transformation matrix is completed, the multiplexer control circuit 21 changes over the second multiplexers 402–432, and the multiplication circuit I repeats this calculation process four times by using the second row of the rotational movement transformation matrix R as the multiplier and replacing the column elements of the translating transformation matrix. Similarly, the multiplication circuit II repeats the calculation process four times by using the elements of the fourth row of the rotational transformation matrix R as the multiplier. Thus, the elements $W_{12}$, $W_{14}$, $W_{22}$, $W_{24}$, $W_{32}$, $W_{34}$, $W_{42}$ and $W_{44}$ of the transformation matrix W are calculated.

When all the transformation matrix W is stored in the matrices elements memory 10, the multiplexer control circuit 21 selects all the terminals A of the first and second multiplexers 302–332 and 402–432 and grounds the cascade terminals K of the multiplicators to form independent 32-bit multiplicators, as shown in FIG. 10. The serial input terminal Y of each multiplicator is connected to the output terminal of the matrices elements memory 10 so that the multiplicators 502–508 of the first group of the multiplication circuit I can be connected to elements $W_{11}$–$W_{14}$ of the first column of the transformation matrix W, the multiplicators of the second group can be connected to elements $W_{21}$–$W_{24}$ of the second column, and the multiplicators of gorups G3 and G4 of the multiplication circuit II can be connected to elements $W_{31}$–$W_{34}$ and $W_{41}$–$W_{44}$ of the third and fourth columns, respectively, as shown in FIG. 10.

After this preparation is completed, the x-coordinate data of the coordinate matrix is input to first multiplicators 502, 510, 518 and 526 in each group, the y-coordinate data is input to second multiplicators 504, 512, 520 and 528, the z-coordinate data is input to third multiplicators 506, 514, 522 and the data 530, and 1 is input to fourth multiplicators 508, 516, 524 and 532. Under this state, the high address of the area holding the transformation matrix W determined in the procedure described above is set in the high address counter 22, and the shift clocks are input to the low address counter 23, so that the multiplicators 502–532 receive the elements of the transformation matrix W. Namely, multiplicator 502 receives the element of column 1, row 1 of the transformation matrix, multiplicator 504 receives the element of column 2, row 1, ..., and multiplicator 532 receives the element of column 4, row 4, starting from the least significant bit, and they execute the multiplication in a serial system. After 96 clocks corresponding to the bit length have thus been applied to the multiplicators, the addition circuit 62 outputs the coordinate data x, the addition circuit 64 outputs the coordinate data y, the addition circuit 66 outputs the coordinate data z, and the addition circuit 68 outputs the data 1, thereby completing the calculation of the data $(x_m', y_m', z_m', 1)$ for one coordinates point $V_m$. In this manner, the coordinate data for each point $v_o, V_1, \ldots$ are sequentially input as multiplicands to the multiplicators 502–532 in order to execute the multiplication by the transformation matrix W. When a number of shift clocks corresponding to the data length have been input, the result of the multiplication is output, making it possible to perform an affine transformation without wasting any time in the calculation process.

What is claimed is:

1. A matrix multiplication apparatus for a graphic display which transforms line segments into a dot pattern and displays a graphic picture corresponding to the dot pattern, the matrix multiplication apparatus comprising: multiplication means for multiplying transformation matrices with each other and for multiplying a coordinate matrix with a transformation matrix; matrix-storing means for storing bit data representative of the elements of the transformation matrices so as to provide multiplicands and multipliers; and a processor for controlling the multiplication means and the matrix-storing means, said processor including means for supplying bit data representative of the elements of the coordinate matrices to the multiplication means as multiplicands; the multiplication means comprising a plurality of groups of serial multiplicators, each multiplicator processing in sequence a predetermined bit length not less than a bit length of the coordinate matrix element and less than a bit length of the transformation matrix element, each multiplicator having a direct-connection terminal for receiving the multipliers from the matrix-storing means and a cascade terminal, first change-over means for connecting the plurality of multiplicators of the different groups in a cascade connection at the cascade terminals so as to receive the multiplicands representative of the transformation matrix elements from the matrix-storing means in sequence and for enabling the multiplicators to operate independently of each other to receive the multiplicands representative of the coordinate matrix elements from the processor in sequence, second change-over means connected between the matrix-storing means and respective ones of the direct-connection terminals for multiplexing the different multipliers fed from the matrix-storing means so as to enable the cascade-connected multiplicators to process the different multipliers, and addition means for adding the results of the multiplications obtained by the multiplicators belonging to the same groups; the matrix-storing means being directly connected to the multiplication means and comprising random access memories having a predetermined number of blocks corresponding to the number of transformation matrix elements, each block being divided into at least one area which stores whole bits of one element of one transformation matrix, high address setting means for designating the area, and low address setting means for serially reading out the bit data representative of the transformation matrix element stored in the designated area from the least significant bit.

2. A matrix multiplication apparatus as defined in claim 1; wherein the first change-over means comprises a plurality of switches each having one output terminal and a pair of input terminals, the one output terminal being connected to respective ones of the cascade terminals, one input terminal being grounded, and the other input terminal being connected to an output terminal of another multiplicator to form the cascade connection.

3. A matrix multiplication apparatus as defined in claim 1; wherein the second change-over means comprises a plurality of switches each having one output terminal and a pair of input terminals, the one output terminal being connected to respective ones of the direct-connection terminals, one input terminal being connected to one block of the matrix-storing means storing an odd-numbered row element of the transformation matrix, and the other input terminal being connected to another block of the matrix-storing means storing an even-numbered row element of the transformation matrix.

4. A matrix multiplication apparatus of a graphic display for multiplying transformation matrices with each other and for multiplying a coordinate matrix with a transformation matrix, the matrix multiplication apparatus comprising: matrix-storing means for storing the transformation matrices, the matrix-storing means comprising random access memories for storing bit data representative of the elements of the transformation matrices, high address setting means for designating the memories storing the elements of one transformation matrix, and low address setting means for reading out multipliers in the form of serial bit data stored in the designated memories in the order from the least significant bit to the most significant bit; data bus means for providing multiplicands in the form of long bit data representative of the elements of another transformation matrix and in the form of short bit data representative of the elements of one coordinate matrix; and multiplication means directly connected to the matrix-storing means for receiving the multipliers and connected to the data bus means for sequentially receiving the multiplicands, the multiplication means comprising a plurality of serial multiplicators for multiplying the same multiplicand of one matrix with the different multipliers of another matrix in one sequence, each multiplicator processing a predetermined bit length of the multiplicand not less than a bit length of the short bit data and less than a bit length of the long bit data, first change-over means operative when the multiplication means receives the long bit data to cascade-connect a predetermined number of the serial multiplicators so that the cascade-connected multiplicators can process the long bit data, and operative when the multiplication means receives the short bit data to enable the plurality of multiplicators to operate independently of each other so that the independent multiplicators can process the short bit data, second change-over means connected between the matrix-storing means and respective ones of the multiplicators for multiplexing the different multipliers fed from the matrix-storing means so as to enable the cascade-connected multiplicators to process the different multipliers with the same multiplicand, and addition means connected to the multiplicators for adding the multiplication products.

5. A matrix multiplication apparatus as defined in claim 4; wherein the random access memories comprise a plurality of blocks corresponding to respective elements of one transformation matrix.

6. A matrix multiplication apparatus as defined in claim 5; wherein the blocks have the same number of areas for storing a plurality of transformation matrices.

7. A matrix multiplication apparatus as defined in claim 6, wherein each area stores a bit data representative of one element of one transformation matrix.

8. A matrix multiplication apparatus as defined in claim 6; wherein the high address setting means includes means for simultaneously designating the areas belonging to the different blocks to store respective elements of the same transformation matrix in the simultaneously designated areas.

9. A matrix multiplication apparatus as defined in claim 4; wherein the data bus means includes means for providing multiplicands in the form of 64-bit data representative of the elements of the one transformation matrix and in the form of 32-bit data representative of the elements of one coordinate matrix.

10. A matrix multiplication apparatus as defined in claim 9; wherein each of the serial multiplicators has a capacity to process 32-bit data.

11. A matrix multiplication apparatus as defined in claim 10; wherein the first change-over means has means for cascade-connecting a pair of the serial multiplicators so that the cascade-connected serial multiplicators have a capacity to process 64-bit data.

12. A matrix multiplication apparatus as defined in claim 4; wherein the plurality of serial multiplicators correspond to respective elements of the transformation matrix.

13. A matrix multiplication apparatus as defined in claim 12; wherein the first change-over means includes means for cascade-connecting a pair of serial multiplicators corresponding to different row elements of the transformation matrix.

14. A matrix multiplication apparatus as defined in claim 13; wherein each of the serial multiplicators comprises a cascade terminal for the cascade connection, a direct-connection terminal for receiving the multipliers from the matrix-storing means, an input terminal for receiving the multiplicand, and an output terminal.

15. A matrix multiplication apparatus as defined in claim 14; wherein the means for cascade-connecting comprises a plurality of first switches for connecting the cascade terminal of one of the pair multiplicators to the output terminal of the other of the pair multiplicators.

16. A matrix multiplication apparatus as defined in claim 15; wherein the second change-over means comprises a plurality of second switches connected between the random access memories and respective direct-connection terminals of the serial multiplicators for selectively applying one of the different multipliers corresponding to different row elements of the transformation matrix.

* * * * *